United States Patent
Takakubo et al.

(10) Patent No.: US 8,570,668 B2
(45) Date of Patent: Oct. 29, 2013

(54) IMAGING OPTICAL SYSTEM AND IMAGING APPARATUS

(75) Inventors: Yutaka Takakubo, Saitama (JP); Eijiroh Tada, Saitama (JP); Koichi Maruyama, Tokyo (JP)

(73) Assignee: Hoya Corporation, Tokyo (JP)

( * ) Notice: Subject to any disclaimer, the term of this patent is extended or adjusted under 35 U.S.C. 154(b) by 87 days.

(21) Appl. No.: 13/237,238

(22) Filed: Sep. 20, 2011

(65) Prior Publication Data

US 2012/0075726 A1    Mar. 29, 2012

(30) Foreign Application Priority Data

Sep. 24, 2010   (JP) ................. 2010-214153

(51) Int. Cl.
*G02B 17/00*   (2006.01)
(52) U.S. Cl.
USPC ........................................... 359/726
(58) Field of Classification Search
USPC ........................................... 359/726
See application file for complete search history.

(56) References Cited

U.S. PATENT DOCUMENTS

| 7,382,546 | B2 | 6/2008 | Konno |
| 2006/0092524 | A1 | 5/2006 | Konno |
| 2008/0266404 | A1 | 10/2008 | Sato |

FOREIGN PATENT DOCUMENTS

| JP | 2004-247887 | 9/2004 |
| JP | 2006-058840 | 3/2006 |
| JP | 2006-154702 | 6/2006 |
| JP | 2007-033819 | 2/2007 |
| JP | 2007-316528 | 12/2007 |
| JP | 2008-268700 | 11/2008 |
| JP | 2010-164841 | 7/2010 |

OTHER PUBLICATIONS

U.S. Appl. No. 13/217,623 to Yutaka Takakubo et al., filed Aug. 25, 2011.
U.S. Appl. No. 13/217,606 to Yutaka Takakubo et al., filed Aug. 25, 2011.
U.S. Appl. No. 13/233,378 to Eijiroh Tada, filed Sep. 15, 2011.

*Primary Examiner* — Jack Dinh
(74) *Attorney, Agent, or Firm* — Greenblum & Bernstein, P.L.C.

(57) ABSTRACT

An imaging optical system, which includes an imaging lens group having at least one lens, and an image side prism that bends light which has passed through the imaging lens group toward an image pickup device arranged at a predetermined position, and wherein the image side prism includes a reflection surface which reflects, toward the image pickup device, incident light proceeding from the imaging lens group and an exit surface from which light reflected from the reflection surface emerges, and wherein the image side prism has a cut surface formed by cutting off a vertex portion between the reflection surface and the exit surface such that a whole normal light incident area within which normal light is incident on the reflection surface remains, and the cut surface is a non-diffusing surface.

10 Claims, 9 Drawing Sheets

IMAGING OPTICAL SYSTEM AND IMAGING APPARATUS

BACKGROUND OF THE INVENTION

The present invention relates to an imaging optical system, and an imaging apparatus having the imaging optical system.

Recently, digital cameras, digital video cameras and digital electronic devices in which an imaging module is mounted, such as a mobile phone, a PDA (Personal Digital Assistant), a PND (Portable Navigation Device), a PHS (Personal Handy phone System), a portable game machine and a notebook computer, have become widespread. Such cameras and digital electronic devices include a device in which an imaging optical system (a so-called bending optical system) configured to have an optical path elongated in a direction orthogonal to a direction of thickness of a device body is mounted so as to decrease the thickness of the device body. Hereafter, for convenience of explanation, the direction of thickness of a device body is referred to as "a case thickness direction", and the direction orthogonal to the case thickness direction is referred to as "a case surface direction".

Incidentally, when an optical path is directed to the case surface direction, a sensor surface of an image pickup chip needs to be positioned to be parallel with the case thickness direction so that an object image can be incident on the sensor surface of the image pickup chip. However, since an outer dimension of the image pickup chip in the sensor surface direction is large, it becomes difficult to design a device body case to be thin when the sensor surface is positioned to be parallel with the case thickness direction.

Each of Japanese Patent Provisional Publications No. 2006-058840A, No. 2006-154702A, No. 2007-033819A, No. 2004-247887A, No. 2007-316528A and No. 2008-268700A discloses an imaging optical system configured to decrease the dimension in the case thickness direction by positioning a sensor surface of an image pickup chip to be parallel with the case surface direction. Specifically, in the imaging optical system disclosed in these publications, a prism is arranged immediately before the image pickup chip and an optical path is bent to the case thickness direction.

SUMMARY OF THE INVENTION

In the imaging optical system disclosed in each of the above described publications, the prism is located immediately before the image pickup chip. Therefore, unwanted light not contributing to normal image formation is caused, and the unwanted light appears on an image as a ghost or flare. The ghost or flare may result in an unintended image or decreasing of the contrast. That is, the ghost or flare deteriorates the image quality. As effective measures for suppressing occurrence of a ghost or flare, one might consider arranging a shield mask on an optical path between an optical element causing the unwanted light and the image pickup chip. However, in the configuration of the imaging optical system disclosed in the above described publications, it is difficult to arrange a shield mask between the image pickup chip and the prism located immediately before the image pickup chip. In addition, it might be impossible to sufficiently suppress the unwanted light by only arranging the shield mask, and therefore it might become impossible to avoid deterioration of the quality of an image even when the shield mask is arranged.

The present invention is advantageous in that it provides an imaging optical system and an imaging apparatus capable of decreasing the thickness of the imaging apparatus while preventing occurrence of unwanted light by a prism located immediately before an image pickup chip.

According to an aspect of the invention, there is provided an imaging optical system, which includes an imaging lens group having at least one lens, and an image side prism that bends light which has passed through the imaging lens group toward an image pickup device arranged at a predetermined position. In this configuration, the image side prism includes a reflection surface which reflects, toward the image pickup device, incident light proceeding from the imaging lens group, and an exit surface from which light reflected from the reflection surface emerges. The image side prism has a cut surface formed by cutting off a vertex portion between the reflection surface and the exit surface such that a whole normal light incident area within which normal light is incident on the reflection surface remains. The cut surface is a non-diffusing surface.

Since light outside the field angle which has totally reflected from the exit surface of the image side prism passes through the cut surface and propagates to the outside of an effective pixel area of the image pickup device, the light outside the field angle is hard to appear on an image as a ghost or flare. Therefore, it is possible to effectively suppress occurrence of a ghost or flare even if the imaging optical system is configured as a so-called bending optical system which is advantageous in designing an imaging apparatus to be thin. That is, it is possible to provide an imaging apparatus capable of decreasing the thickness thereof while preventing occurrence of unwanted light by a prism located immediately before an image pickup device.

In at least one aspect, when $N_p$ denotes a refractive index of the image side prism, $N_o$ denotes a refractive index of a medium outside the image side prism and $\alpha$ denotes an angle formed between the exit surface and the cut surface, the imaging optical system may satisfy a condition:

$$\alpha > \pi/2 - \mathrm{SIN}^{-1}(N_o/N_p) \tag{1}$$

In at least one aspect, the imaging optical system may satisfy a condition:

$$\alpha > (\pi/2 + \mathrm{SIN}^{-1}(N_o/N_p))/2 \tag{2}$$

In at least one aspect, the image side prism may bend an optical path by approximately 90°.

In at least one aspect, the imaging optical system may further include an object side prism located on an object side with respect to the image side prism. In this case, the object side prism is arranged such that at least one lens of lenses of the imaging lens group is located between the object side prism and the image side prism.

In at least one aspect, the object side prism bends an optical path by approximately 90°.

According to another aspect of the invention, there is provided an imaging apparatus, which includes one of the above described imaging optical systems, and an image pickup device. In this configuration, the image pickup device is arranged such that a sensor surface of the image pickup device is positioned on an image plane of the imaging optical system.

With this configuration, it is possible to provide an imaging apparatus capable of decreasing the thickness thereof while preventing occurrence of unwanted light by a prism located immediately before an image pickup device.

BRIEF DESCRIPTION OF THE ACCOMPANYING DRAWINGS

DETAILED DESCRIPTION OF THE EMBODIMENTS

Hereinafter, an embodiment according to the invention is described with reference to the accompanying drawings.

Figures 1A, 1B:
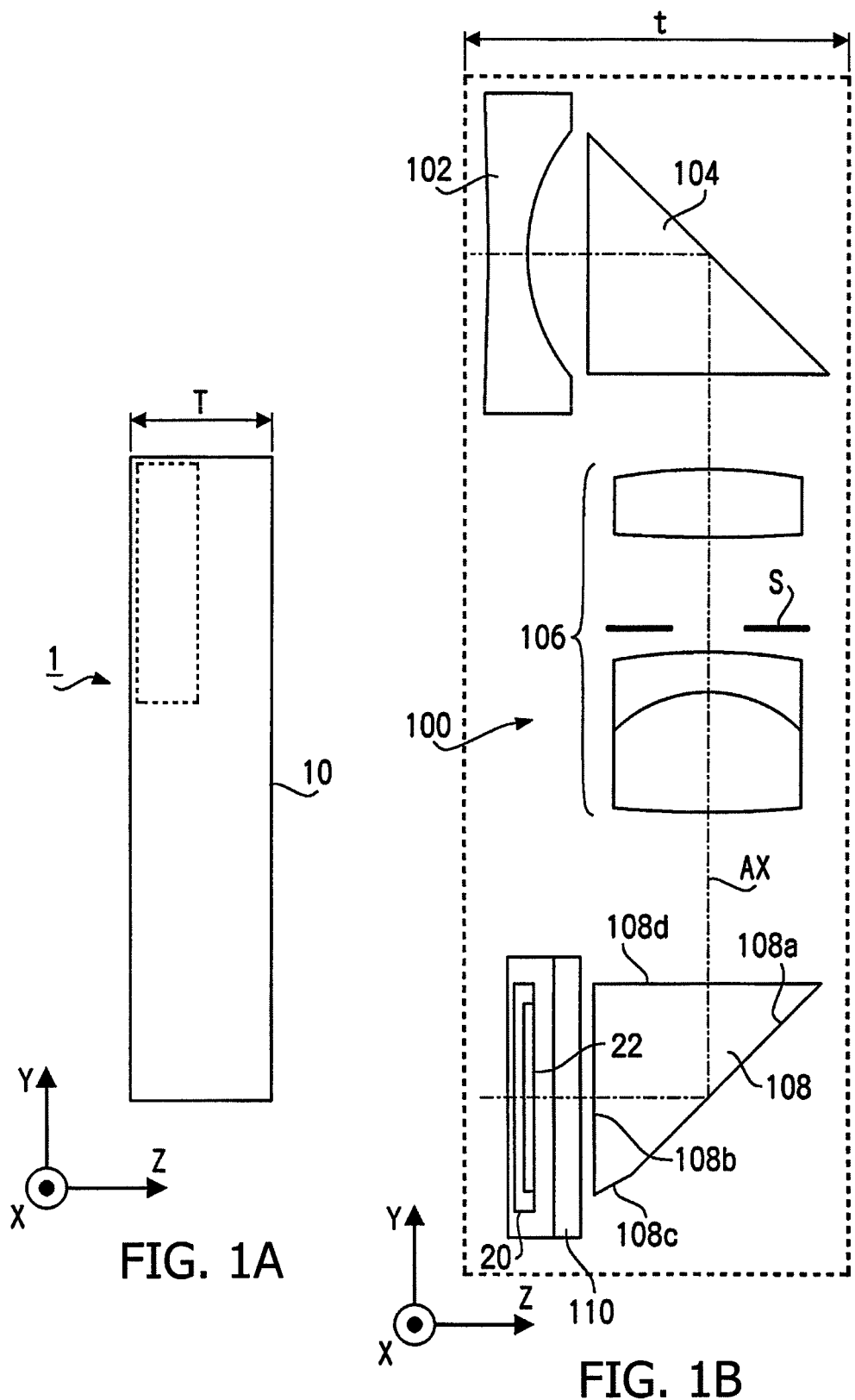
FIGS. 1A and 1B illustrate a configuration of an imaging apparatus according to an embodiment of the invention.

FIGS. 1A and 1B illustrate a configuration of an imaging apparatus 1 according to the embodiment of the invention. In FIGS. 1A and 1B, an optical configuration of the imaging apparatus 1 (i.e., a substantial part of the embodiment) is illustrated, and a mechanical configuration and a circuit configuration which are not substantial parts of the embodiment are omitted for the sake of simplicity. In this embodiment, the imaging apparatus 1 is, for example, a mobile phone. However, in another embodiment, the imaging apparatus 1 may be a digital camera, a digital video camera or a digital electronic device in which an imaging module is mounted, such as a mobile phone, PDA, PND, PHS, a portable game machine and a notebook computer. Alternatively, the imaging apparatus 1 may be an imaging module.

As shown in FIG. 1A, the imaging apparatus 1 includes a case 10 having a thickness T. In FIG. 1A, for convenience of explanation, the direction of the thickness T of the case 10 is defined as a Z axis direction, and two directions which are perpendicular to the Z axis direction and are perpendicular to each other are defined as a X axis direction (perpendicular to a paper face of FIGS. 1A and 1B) and a Y axis direction (parallel with the paper face of FIGS. 1A and 1B). An internal block diagram of a box indicated by a dashed line in FIG. 1A is illustrated in FIG. 1B. As shown in FIG. 1B, the imaging apparatus 1 includes an imaging optical system 100. The imaging optical system 100 includes an objective lens 102, an object side prism 104, an imaging lens group 106, an image side prism 108 and a cover glass 110. Each of the object side prism 104 and the image side prism 108 is a right angle prism configured to bend an optical path by 90°. In the imaging lens group 106, an aperture stop S is arranged. In FIG. 1B, a chain line represents an optical axis AX of the imaging optical system 100.

Light proceeding in the Z axis direction (i.e., the case thickness direction) from an object is incident on the objective lens 102 and is bent toward the Y axis direction (i.e., the case surface direction) by the object side prism 104. Then, the light passes through the imaging lens group 106, and is bent again toward the Z axis direction by a reflection surface 108a of the image side prism 108. The light which has reflected from the reflection surface 108a passes through an exit surface 108b of the image side prism 108, and passes through the cover glass 110. The cover glass 110 seals an image pickup chip 20 adhered to a resin package. The light which has passed through the cover glass 100 is incident, within an effective pixel area of a sensor surface 22, on the sensor surface 22 of the image pickup chip 20. The image pickup chip 20 is arranged such that the sensor surface 22 is parallel with the XY plane so as to let the light bent toward the Z axis direction by the reflection surface 108a be perpendicularly incident on the affective pixel area of the sensor surface 22. By thus arranging the image pickup chip 20 having a larger dimension in the sensor surface direction, it becomes possible to decrease, in the Z axis direction, the dimension t of a block including the imaging optical system 100 and the image pickup chip 20. As a result, the thickness T of the case 10 can be decreased, and the imaging apparatus 1 can be formed to be thin.

The image pickup chip 20 is, for example, a single-chip color CMOS (Complementary Metal Oxide Semiconductor) image sensor having a bayer layout. The sensor surface 22 of the image pickup chip 20 is located on an image plane of the imaging lens group 106. The image pickup chip 20 accumulates, at each pixel, charges responsive to a light amount of an optical image formed on the sensor surface 22, and converts the charges into an image signal. The image signal is input to an image processing engine (not shown). The image processing engine executes various types of image processing, such as, generating an image by processing the image signal, displaying the generated image and recording the generated image in a recording medium. The image pickup chip 20 is not limited to the CMOS sensor chip, and various types of image pickup chips (e.g., a CCD (Charge Couple Device) image sensor chip) may be used as the image pickup chip 20.

Figure 2:
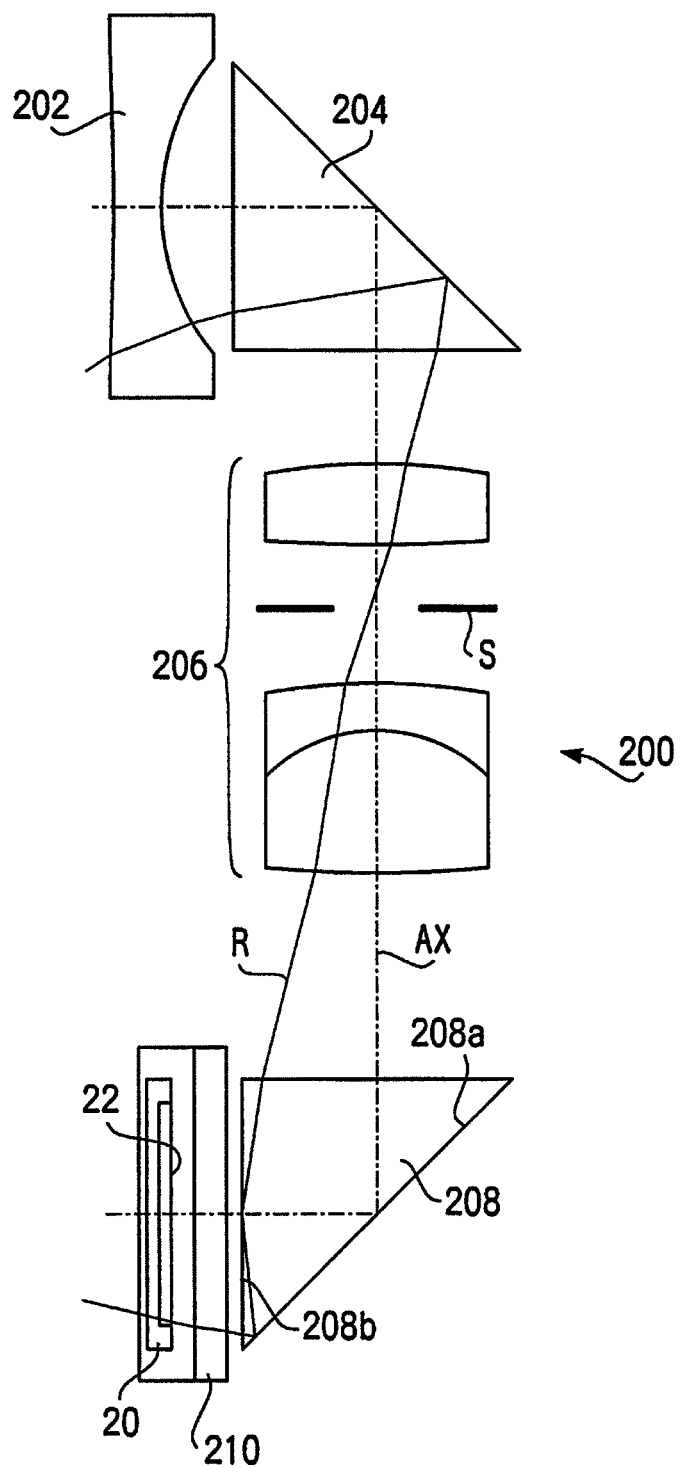
FIG. 2 is an explanatory illustration for explaining an example of a ghost or flare caused by unwanted light in a conventional imaging optical system.

Incidentally, with regard to an optical path between the image side prism 108 and the image pickup chip 20, there is no space for arranging a mask for blocking only the unwanted light without blocking normal light contributing to the normal image formation. Therefore, there is a concern that the unwanted light caused by the image side prism 108 appears on the image as a ghost or flare and thereby deteriorates the quality of the image. FIG. 2 is an explanatory illustration for explaining an example of a ghost or flare caused by unwanted light in a conventional imaging optical system 200. In FIG. 2, a light ray R is on the outside of the maximum field angle (hereafter, light on the outside of the maximum field angle is simply referred to as "light outside the field angle"), and, according to a design condition, the light ray R is not incident on the effective pixel area of the sensor surface 22. In FIG. 2 showing the conventional imaging optical system 200, to elements which are substantially the same as those of the embodiment, the same reference numbers are assigned and explanations thereof will not be repeated.

The conventional imaging optical system 200 shown in FIG. 2 includes an objective lens 202, an object side prism 204, an imaging lens group 206, an image side prism 208 and a cover glass 210. The light ray R is incident on the objective lens 202 and is bent by the object side prism 204 by 90°. Then, the light ray R is incident on the image side prism 208 after passing through the imaging lens group 206. The light ray R is incident on an exit surface 208b of the image side prism 208. An incident angle of the light ray R with respect to the exit surface 208b is large, and is larger than or equal to a critical angle. Therefore, the light ray R totally reflects from the exit surface 208b. The light ray R which has totally reflected from the exit surface 208b is incident on a reflection surface 208a of the image side prism 208. Then, the light ray R passes through the exit surface 208b after totally reflecting again from the reflection surface 208a. Then, the light ray R passes through the cover glass 210, and is incident on the sensor surface 22 within an effective pixel area of the sensor surface 22. As described above, in the conventional imaging optical system 200, the light outside the field angle which has totally reflected from the exit surface 208b appears on an image as a ghost or flare, and thereby deteriorates the quality of the image.

In the imaging optical system 100 according to the embodiment, a vertex portion formed between the reflection surface 108a and the exit surface 108b of the image side prism 108 is cut off in order to suppress occurrence of a ghost or flare of the above described type. As a result, a cut surface 108c is formed. Specifically, the vertex portion is cut off such that a normal light incident area on the reflection surface 108a remains (i.e., the normal light incident area is not cut off). As used herein, the normal light incident area means an area within which the normal light falls (i.e., an area indicated by an arrow F in FIG. 10). It should be noted that an angle formed between the cut surface 108c (i.e., a connection surface which connects the reflection surface 108a with the exit surface 108b) and the exit surface 108b is larger than an angle formed between the reflection surface 108a and the exit surface 108b.

Figure 3A:
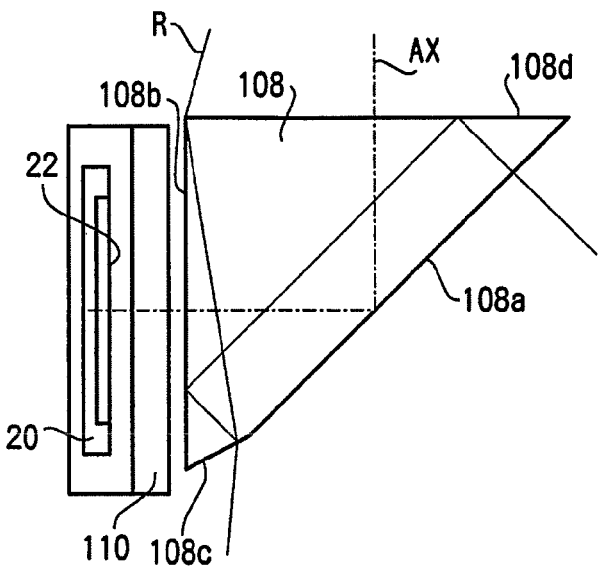
FIGS. 3A, 3B and 3C are explanatory illustrations for explaining an optical path of a light ray which has entered an image side prism according to the embodiment of the invention.

FIG. 3A is an explanatory illustration for explaining an optical path of the light ray R which has entered the image side prism 108. As shown in FIG. 3A, the light ray R which has entered the image side prism 108 totally reflects from the exit surface 108b, and then is incident on the cut surface 108c. Since the angle formed between the cut surface 108c and the exit surface 108b is larger than the angle formed between the exit surface 108b and the reflection surface 108a, the incident angle of the light ray R with respect to the cut surface 108c is smaller than the incident angle of the light ray R in the case of FIG. 2 (i.e., the incident angle of the light ray R with respect to the cut surface 108c is smaller than the incident angle of the light ray R with respect to the reflection surface 208a). Therefore, a reflection component of the light ray R reflecting from the cut surface 108c decreases in comparison with the case shown in FIG. 2 (i.e., a reflection component of the light ray R reflecting from the reflections surface 208a). Thanks to the decrease of the reflecting component, the light outside the field angle which has totally reflected from the exit surface 108b becomes hard to appear in the image as a ghost or flare.

In FIG. 3A, the incident angle of the light ray R with respect to the cut surface 108c is smaller than the critical angle. Therefore, the light ray R passes through the cut surface 108c. The light which has passes through the reflection surface 108a propagates to the outside of the effective pixel area of the sensor surface 22. Therefore, according to the embodiment, occurrence of a ghost or flare can be suppressed effectively.

More specifically, although a major part of the light ray R passes through the cut surface 108c in FIG. 3A, a part of the light ray R reflects from the cut surface 108c as a reflection component different from the totally reflected light. In this regard, the reflection component (i.e., light reflected from the cut surface 108c) passes through the reflection surface 108a after totally reflecting from the exit surface 108b and an entrance surface 108d in this order. Since the light which has passed through the reflection surface 108a propagates to the outside of the effective pixel area of the sensor surface 22, occurrence of a ghost or flare can be suppressed effectively.

When Np denotes a refractive index of the image side prism 108, No denotes a refractive index of a medium outside the image side prism 108 and $\alpha$ denotes the angle formed between the exit surface 108b and the cut surface 108c, the imaging optical system 100 may be configured to satisfy a following condition (1).

$$\alpha > \pi/2 - \mathrm{SIN}^{-1}(No/Np) \tag{1}$$

When the condition (1) is satisfied, total reflection does not occur on the cut surface 108c and therefore light passes through the cut surface 108c. Therefore, occurrence of a ghost or flare can be suppressed more effectively. When the condition (1) is not satisfied, total reflection occurs on the cut surface 108c. In this case, the totally reflected light may be incident on the sensor surface 22, and a ghost or flare become easy to occur.

Figures 3B, 3C:
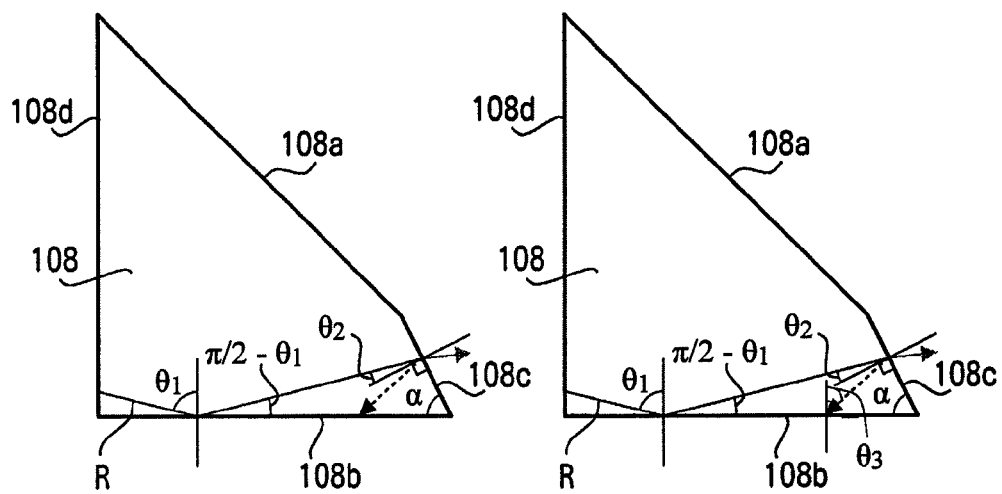

FIG. 3B is an explanatory illustration for explaining derivation of the condition (1). In FIG. 3B, the incident angle of the light ray R with respect to the exit surface 108b is defined as $\theta_1$, and the incident angle of the light ray R with respect to the cut surface 108c is defined as $\theta_2$. The light ray R totally reflects from the cut surface 108c when the incident angle $\theta_2$ is larger than the critical angle $\theta$ ($=\mathrm{SIN}^{-1}(No/Np)$). In other words, the total reflection does not occur when $\theta_2 < \theta$.

Since $\theta_2 = \theta_1 - \alpha$ in FIG. 3B, $\theta_2 < \theta$ can be rewritten into:

$$\theta_1 - \alpha < \mathrm{SIN}^{-1}(No/Np)$$

Furthermore, the above indicated expression can be rewritten into:

$$\alpha > \theta_1 - \mathrm{SIN}^{-1}(No/Np)$$

Since the maximum value of $\theta_1$ is 90 degrees, the condition (1) can be derived from the above indicated expression.

The imaging optical system 100 may be configured to satisfy a following condition (2).

$$\alpha > (\pi/2 + \mathrm{SIN}^{-1}(No/Np))/2 \tag{2}$$

When the condition (2) is satisfied, the reflection component (i.e., the light reflected from the cut surface 108c) totally reflects from the exit surface 108b. Therefore, occurrence of a ghost or flare can be suppressed more effectively. When the condition (2) is not satisfied, a possibility arises that the reflection component of light from the cut surface 108c impinges on the effective pixel area of the sensor surface 22 after passing through the exit surface 108b. In this case, a ghost or flare becomes easy to occur.

FIG. 3C is an explanatory illustration for explaining derivation of the condition (2). As in the case of FIG. 3B, the angles $\theta_1$ and $\theta_2$ are defined in FIG. 3C. In addition, in FIG. 3C an incident angle of the reflection component of light from the cut surface 108c with respect to the exit surface 108b is defined as $\theta_3$. When the incident angle $\theta_3$ is larger than the critical angle $\theta$, the light ray R totally reflects from the exit surface 108b.

Since in FIG. 3C $$\theta_3 = \theta_1 - 2\theta_2 \text{ and}$$

$$\theta_2 = \theta_1 - \alpha,$$

$\theta_3 = 2\alpha - \theta_1$ can be derived.

$\theta_3 > \theta$ can be rewritten into:

$$2\alpha - \theta_1 > \mathrm{SIN}^{-1}(No/Np)$$

The above indicated expression can be further rewritten into:

$$\alpha > (\theta_1 + \mathrm{SIN}^{-1}(No/Np))/2$$

Since the maximum value of $\theta_1$ is 90 degrees, the condition (2) can be derived from the above indicated expression.

Hereafter, three concrete numeric examples (first to third examples) of the imaging optical system 100 installed in the above described imaging apparatus 1 are explained, and three comparative examples according to the conventional imaging optical system 200 are explained. The imaging optical system 100 according to each of the first to third examples has a common configuration on the object side with respect to the image side prism 108 as shown in FIG. 1. Therefore, in the following explanation for the first to third examples, only the optical configuration after the image side prism 108 is explained for the sake of simplicity. The first to third comparative examples according to the conventional imaging optical system 200 have a common configuration on the object side with respect to the image side prism 208 as shown in FIG. 2. Therefore, in the following explanation for the first to third comparative examples, only the optical configuration after the image side prism 208 is explained for the sake of simplicity. In the drawings for explaining the first to third examples, to elements which are substantially the same as those of the above described embodiment, the same reference numbers are assigned and explanation thereof will not be repeated.

FIRST EXAMPLE

Figure 4:
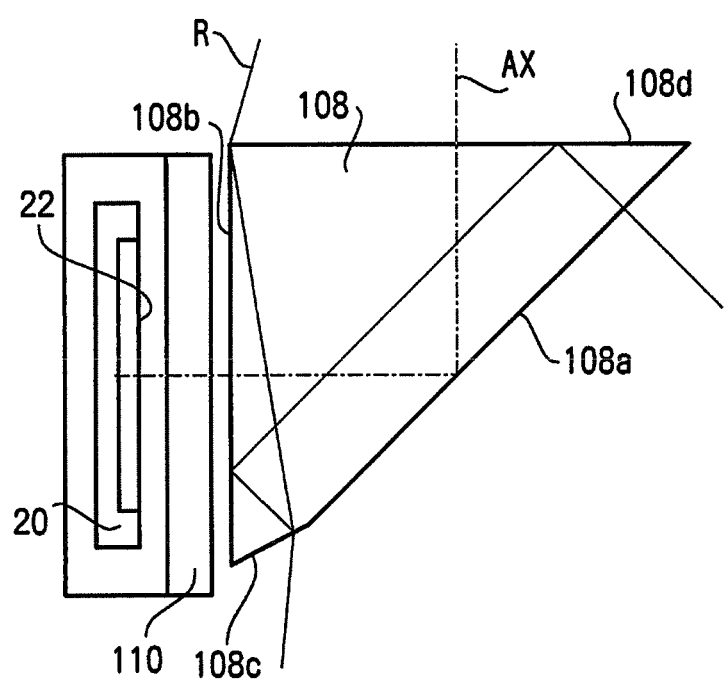
FIG. 4 illustrates a configuration of the imaging optical system according to a first example of the invention.

FIG. 4 illustrates a configuration of the imaging optical system 100 according to the first example. Table 1 shows a numeric configuration (design values) of the imaging optical system 100 according to the first example. In Table 1, "R" denotes the curvature radius (unit: mm) of each optical surface, "D" denotes the thickness of an optical component or the distance (unit: mm) from each optical surface to the next optical surface on the optical axis AX, "Nd" represents the refractive index at a d-line (the wavelength of 588 nm). The definitions regarding Table and drawings of the first example are also applied to the following examples and the comparative examples. In each of the first to third examples and the first to third comparative examples, each of the imaging optical systems 100 and 200 has the focal length of 4.0 mm, and the maximum image height in a cross sectional plane (YZ plane) in which the optical path is bent by the image side prism (108 or 208) is 2.45 mm.

TABLE 1

| Surface No. | R | D | Nd | Comments |
|---|---|---|---|---|
| 1 | −38.947 | 0.700 | 1.58913 | Objective Lens 102 |
| 2 | 3.451 | 1.030 | 1.00000 | |
| 3 | ∞ | 2.100 | 1.74400 | Object Side Prism 104 |
| 4 | ∞ | 2.100 | | |
| 5 | ∞ | 1.649 | 1.00000 | |
| 6 | 9.010 | 1.193 | 1.84666 | Imaging Lens Group 106 |
| 7 | −26.650 | 0.894 | 1.00000 | |
| 8 (aperture stop) | ∞ | 1.167 | | |
| 9 | 10.422 | 0.700 | 1.84666 | |
| 10 | 2.221 | 2.123 | 1.77250 | |
| 11 | −12.176 | 2.674 | 1.00000 | |
| 12 | ∞ | 2.500 | 1.74400 | Image Side Prism 108 |
| 13 | ∞ | 2.500 | | |
| 14 | ∞ | 0.200 | 1.00000 | |
| 15 | ∞ | 0.500 | 1.51633 | Cover Glass 110 |
| 16 | ∞ | 0.300 | 1.00000 | |
| 17 | ∞ | | | Sensor Surface 22 |

SECOND EXAMPLE

Figure 5:
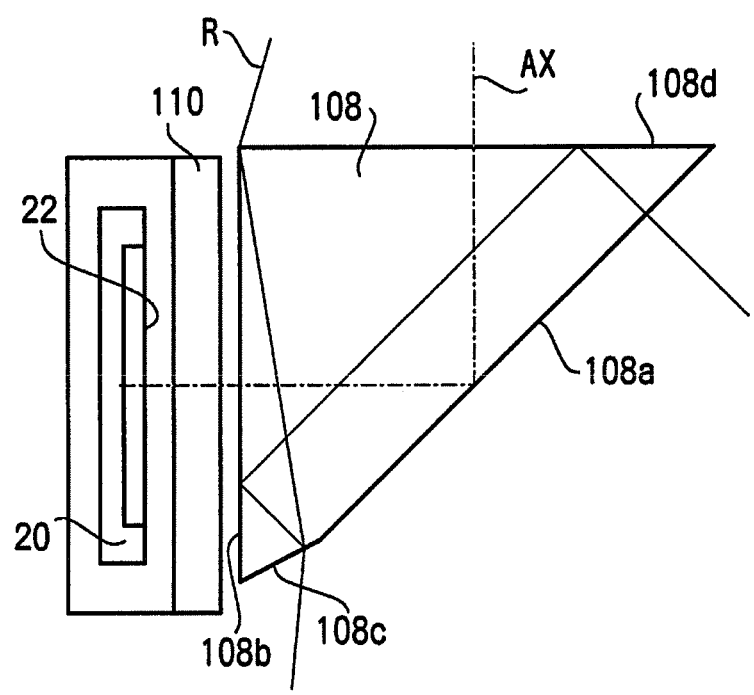
FIG. 5 illustrates a configuration of the imaging optical system according to a second example of the invention.

FIG. 5 illustrates a configuration of the imaging optical system 100 according to the second example. Table 2 shows a numeric configuration (design values) of the imaging optical system 100 according to the second example. In Table 2 (and in similar tables in the following examples and the comparative examples), surfaces #1 to #10 have the same numeric values as those of the surfaces #1 to #10 in Table 1, and therefore explanations thereof will not be repeated for the sake of simplicity.

TABLE 2

| Surface No. | R | D | Nd | Comments |
|---|---|---|---|---|
| 11 | −12.176 | 2.540 | 1.00000 | |
| 12 | ∞ | 2.500 | 1.69680 | Image side prism 108 |
| 13 | ∞ | 2.500 | | |
| 14 | ∞ | 0.200 | 1.00000 | |
| 15 | ∞ | 0.500 | 1.51633 | Cover glass 110 |
| 16 | ∞ | 0.380 | 1.00000 | |
| 17 | ∞ | | | Sensor surface 22 |

THIRD EXAMPLE

Figure 6:
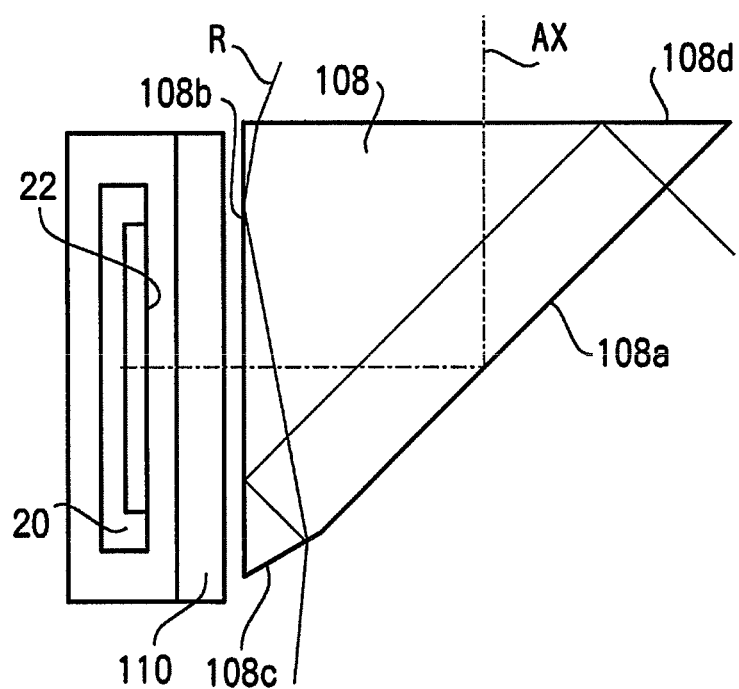
FIG. 6 illustrates a configuration of the imaging optical system according to a third example of the invention.

FIG. 6 illustrates a configuration of the imaging optical system 100 according to the third example. Table 3 shows a numeric configuration (design values) of the imaging optical system 100 according to the third example.

TABLE 3

| Surface No. | R | D | Nd | Comments |
|---|---|---|---|---|
| 11 | −12.176 | 2.760 | 1.00000 | |
| 12 | ∞ | 2.500 | 1.83400 | Image Side Prism 108 |
| 13 | ∞ | 2.500 | | |
| 14 | ∞ | 0.200 | 1.00000 | |
| 15 | ∞ | 0.500 | 1.51633 | Cover Glass 110 |
| 16 | ∞ | 0.380 | 1.00000 | |
| 17 | ∞ | | | Sensor Surface 22 |

COMPARATIVE EXAMPLES

Figure 7:
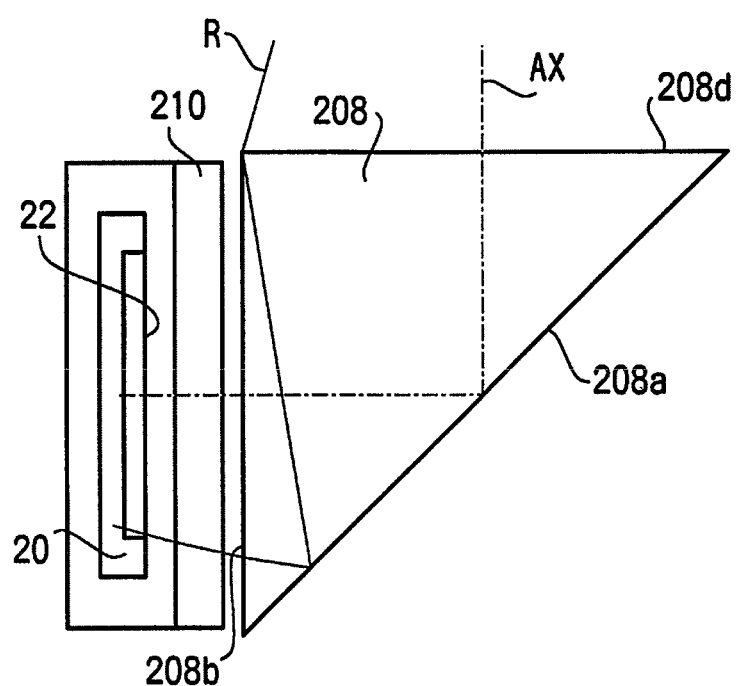
FIG. 7 illustrates a configuration of an imaging optical system according to a first comparative example.
Figure 8:
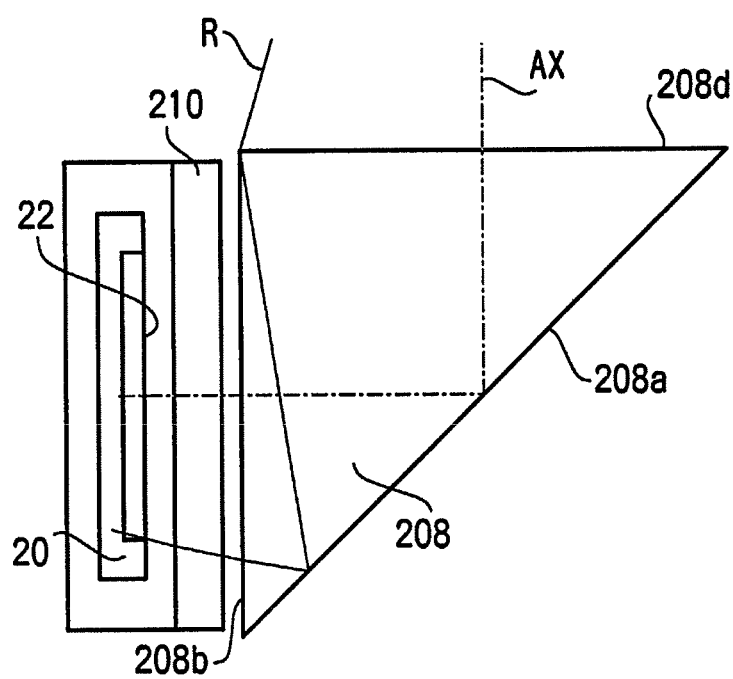
FIG. 8 illustrates a configuration of the imaging optical system according to a second comparative example.
Figure 9:
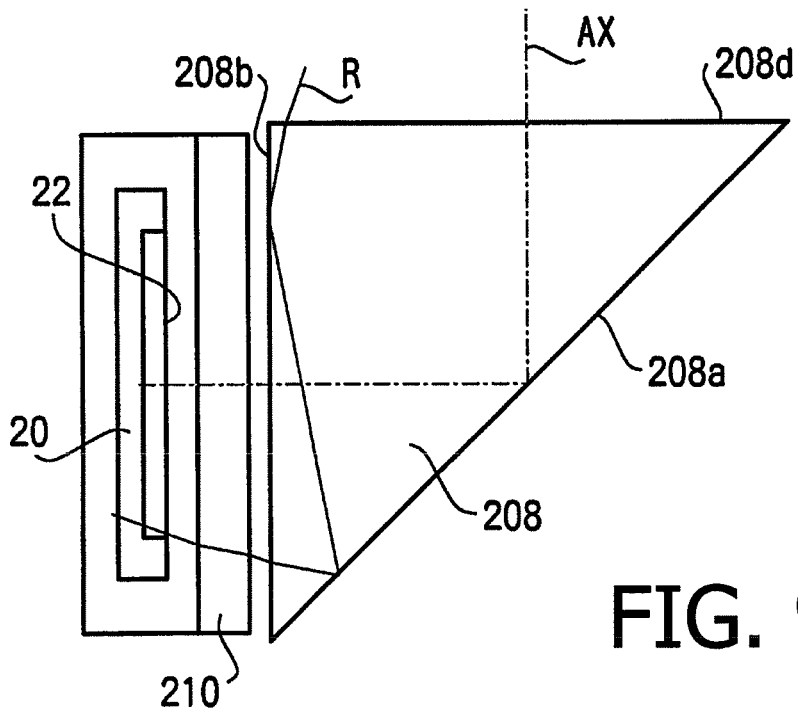
FIG. 9 illustrates a configuration of the imaging optical system according to a third comparative example.

FIG. 7 illustrates a configuration of the imaging optical system 200 according to the first comparative example, FIG. 8 illustrates a configuration of the imaging optical system 200 according to the second comparative example, and FIG. 9 illustrates a configuration of the imaging optical system 200 according to the third comparative example. In the drawings for explaining the first to third comparative examples, to elements which are substantially the same as those shown in FIG. 2, the same reference numbers are assigned and explanation thereof will not be repeated. The numeric configurations of the first to third comparative examples are respectively equal to those of the above described first to third examples (the imaging optical system 100), excepting that each of the first to third comparative examples does not have the cut surface 108c.

Figure 10:
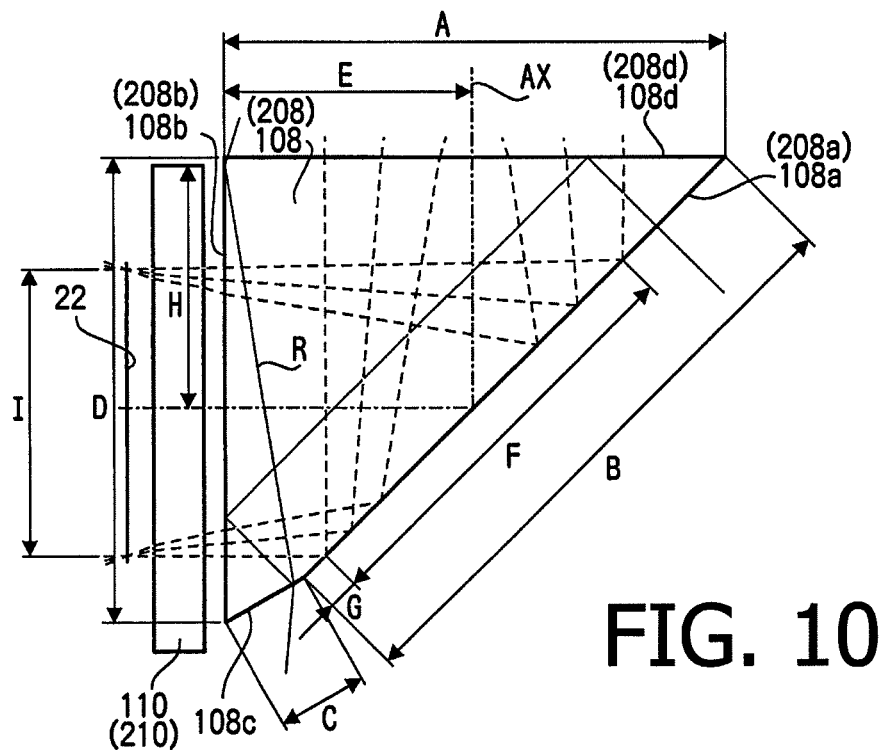
FIG. 10 is an explanatory illustration for explaining the dimension of the image side prism of each of the first to third examples and the image side prism of each of the first to third comparative examples.

FIG. 10 is an explanatory illustration for explaining the dimension of the image side prism 108 of each of the first to third examples and the image side prism 208 of each of the first to third comparative examples. In FIG. 10, a dashed line represents the optical path of the normal light. The field angle of the normal light is ±20.2°. Table 4 shows the dimensions of the image side prism 108 of each of the first to third examples and the image side prism 208 of each of the first to third comparative examples. In Table 4, the dimensions corresponding to reference symbols used in FIG. 10 are shown. In Table 4, the unit of each dimension is mm.

TABLE 4

| Reference Symbol | Comments | 1st Example | 2nd Example | 3rd Example |
|---|---|---|---|---|
| A | Width of Entrance Surface 108d | 5.00 | 5.00 | 5.00 |
| B | Width of Reflection Surface 108a | 5.89 | 5.83 | 5.99 |
| C | Width of Cut Surface 108c | 0.95 | 0.99 | 0.87 |
| D | Width of Exit Surface 108b | 4.60 | 4.56 | 4.65 |
| E | Distance Between Optical Axis AX and Exit Surface 108b | 2.50 | 2.50 | 2.50 |
| F | Effective Area of Reflection Surface 108a | 4.15 | 4.16 | 4.16 |
| G | Distance between Cut surface 108c and Effective Area of Reflection Surface 108a | 0.30 | 0.24 | 0.41 |
| H | Distance Between Optical Axis AX and Entrance Surface 108d | 2.50 | 2.50 | 2.50 |
| I | Width of Effective Area of Sensor Surface 22 | 2.94 | 2.94 | 2.94 |

| Symbol | Comments | 1st comparative example | 2nd comparative example | 3rd comparative example |
|---|---|---|---|---|
| A | Width of Entrance Surface 208d | 5.00 | 5.00 | 5.00 |
| B | Width of Reflection Surface 208a | 7.07 | 7.07 | 7.07 |
| C | Width of Cut Surface 108c | — | — | — |
| D | Width of Exit Surface 208b | 5.00 | 5.00 | 5.00 |
| E | Distance Between Optical Axis AX and Exit Surface 208b | 2.50 | 2.50 | 2.50 |
| F | Effective Area of Reflection Surface 208a | 4.15 | 4.16 | 4.16 |
| G | Distance between Cut surface 108c and Effective Area of Reflection Surface 208a | — | — | — |
| H | Distance Between Optical Axis AX and Entrance Surface 208d | 2.50 | 2.50 | 2.50 |
| I | Width of Effective Area of Sensor Surface 22 | 2.94 | 2.94 | 2.94 |

Table 5 shows values of the angle α, the right term of the condition (1), the right term of the condition (2) and the incident angle of the light ray R with respect to the entrance surface 108d of each of the first to third examples and the first to third comparative examples. Since each of the first to third comparative examples does not have the cut surface 108c, the angle between the reflection surface 208a and the exit surface 208b is represented as a for convenience of illustration.

TABLE 5

| | Unit | 1st Example | 2nd Example | 3rd Example |
|---|---|---|---|---|
| α | Degree | 62.6 | 63.2 | 61.6 |
| Right term of condition (1) | Degree | 55.0 | 53.9 | 57.0 |
| Right term of condition (2) | Degree | 62.5 | 63.1 | 61.5 |
| Incident angle of light ray R with respect to entrance surface 108d | Degree | 16.7 | 15.3 | 20.0 |

| | Unit | 1st Comparative Example | 2nd Comparative Example | 3rd Comparative Example |
|---|---|---|---|---|
| α | Degree | 45.0 | 45.0 | 45.0 |
| Right term of condition (1) | Degree | 55.0 | 53.9 | 57.0 |
| Right term of condition (2) | Degree | 62.5 | 63.1 | 61.5 |
| Incident angle of light ray R with respect to entrance surface 208d | Degree | 16.7 | 15.3 | 20.0 |

Since the image side prism 208 of each of the first to third comparative examples does not have the cut surface 108c, the light outside the field angle which has totally reflected from the exit surface 208b tends to totally reflect from the reflection surface 208a and thereby to enter the effective pixel area of the sensor surface 22. That is, in the imaging optical system 200 according to each of the first to third comparative examples, the light outside the field angle which has totally reflected from the exit surface 208b tends to appear on an image as a ghost or flare.

By contrast, the image side prism 108 according to each of the first to third examples has the cut surface 108c. Therefore, the light outside the field angle which has totally reflected from the exit surface 108b passes through the cut surface 108c and propagates to the outside of the effective pixel area of the sensor surface 22. That is, the light outside the field angle which has totally reflected from the exit surface 108b is hard to appear on an image as a ghost or flare. Since the imaging optical system according to each of the first to third examples satisfies the condition (1), total reflection does not occur on the cut surface 108c. The light totally reflected from the exit surface 108b passes through the cut surface 108c and propagates to the outside of the effective pixel area of the sensor surface 22. Therefore, occurrence of a ghost or flare can be suppressed more effectively. Since the imaging optical system 100 according to each of the first to third examples satisfies also the condition (2), the reflection component of light from the cut surface 10c totally reflects from the exit surface 108b, and therefore does not enter the sensor surface 22. Therefore, occurrence of a ghost or flare can be suppressed more effectively.

Although the present invention has been described in considerable detail with reference to certain preferred embodiments thereof, other embodiments are possible. For example, the object side prism 104 may be substituted by a mirror serving to bend an optical path. The object side prism 104 may not be arranged at the position on the object side with respect to the imaging lens group 106. For example, the object side prism 104 may be arranged at a position between lenses constituting the imaging lens group 106.

In the above described embodiment, the cut surface 108c is formed as a light-transmitting surface. However, the cut surface 108c may be formed as a light absorption surface. The light absorption surface is, for example, a surface which is formed by applying, to a ground optical surface, coating material which has a refractive index close to the medium (i.e., the image side prism 108) and has a light absorption structure (e.g., black ink). If the cut surface 108c close to the sensor surface 22 is formed as a diffusing surface, the diffused light might enter the sensor surface 22 and thereby appears on an image as a ghost or flare. Therefore, it is not desirable to form the cut surface 108c as a diffusing surface.

This application claims priority of Japanese Patent Application No. P2010-214153, filed on Sep. 24, 2010. The entire subject matter of the application is incorporated herein by reference.

What is claimed is:

1. An imaging optical system, comprising:
an imaging lens group having at least one lens; and
an image side prism that bends light which has passed through the imaging lens group toward an image pickup device arranged at a predetermined position, wherein
the image side prism includes a reflection surface which reflects, toward the image pickup device, incident light proceeding from the imaging lens group, and an exit surface from which light reflected from the reflection surface emerges,
the image side prism has a cut surface formed by cutting off a vertex portion between the reflection surface and the exit surface such that a whole normal light incident area within which normal light is incident on the reflection surface remains,
the cut surface is a non-diffusing surface, and
when $N_p$ denotes a refractive index of the image side prism, $N_o$ denotes a refractive index of a medium outside the image side prism and $\alpha$ denotes an angle formed between the exit surface and the cut surface, the imaging optical system satisfies a condition:

$$\alpha > \pi/2 - \mathrm{SIN}^{-1}(N_o/N_p) \tag{1}.$$

2. The imaging optical system according to claim 1, wherein the image side prism bends an optical path by approximately 90°.

3. The imaging optical system according to claim 1, further comprising an object side prism located on an object side with respect to the image side prism, the object side prism being arranged such that at least one lens of the imaging lens group is located between the object side prism and the image side prism.

4. The imaging optical system according to claim 3, wherein the object side prism bends an optical path by approximately 90°.

5. An imaging optical system, comprising:
an imaging lens group having at least one lens; and
an image side prism that bends light which has passed through the imaging lens group toward an image pickup device arranged at a predetermined position, wherein
the image side prism includes a reflection surface which reflects, toward the image pickup device, incident light proceeding from the imaging lens group, and an exit surface from which light reflected from the reflection surface emerges,
the image side prism has a cut surface formed by cutting off a vertex portion between the reflection surface and the exit surface such that a whole normal light incident area within which normal light is incident on the reflection surface remains,
the cut surface is a non-diffusing surface, and
when $N_p$ denotes a refractive index of the image side prism, $N_o$ denotes a refractive index of a medium outside the image side prism and $\alpha$ denotes an angle formed between the exit surface and the cut surface, the imaging optical system satisfies a condition:

$$\alpha > (\pi/2 + \mathrm{SIN}^{-1}(N_o/N_p))/2 \tag{2}.$$

6. An imaging apparatus, comprising:
an imaging optical system; and
an image pickup device,
wherein the imaging optical system includes:
an imaging lens group having at least one lens; and
an image side prism that bends light which has passed through the imaging lens group toward the image pickup device arranged at a predetermined position, wherein,
the image side prism includes a reflection surface which reflects, toward the image pickup device, incident light proceeding from the imaging lens group, and an exit surface from which light reflected from the reflection surface emerges,
the image side prism has a cut surface formed by cutting off a vertex portion between the reflection surface and the exit surface such that a whole normal light incident area within which normal light is incident on the reflection surface remains,
the cut surface is a non-diffusing surface,
the image pickup device is arranged such that a sensor surface of the image pickup device is positioned on an image plane of the imaging optical system, and
when $N_p$ denotes a refractive index of the image side prism, $N_o$ denotes a refractive index of a medium outside the image side prism and $\alpha$ denotes an angle formed between the exit surface and the cut surface, the imaging optical system satisfies a condition:

$$\alpha > \pi/2 - \mathrm{SIN}^{-1}(N_o/N_p) \tag{1}.$$

7. The imaging apparatus according to claim 6, wherein the image side prism bends an optical path by approximately 90°.

8. The imaging apparatus according to claim 6, further comprising an object side prism located on an object side with respect to the image side prism, the object side prism being arranged such that at least one lens of the imaging lens group is located between the object side prism and the image side prism.

9. The imaging apparatus according to claim 8, wherein the object side prism bends an optical path by approximately 90°.

10. An imaging apparatus, comprising:
an imaging optical system; and
an image pickup device,
wherein the imaging optical system includes:
an imaging lens group having at least one lens; and an image side prism that bends light which has passed through the imaging lens group toward the image pickup device arranged at a predetermined position, wherein the image side prism includes a reflection surface which reflects, toward the image pickup device, incident light proceeding from the imaging lens group, and an exit surface from which light reflected from the reflection surface emerges, the image side prism has a cut surface formed by cutting off a vertex portion between the reflection surface and the exit surface such that a whole normal light incident area within which normal light is incident on the reflection surface remains, the cut surface is a non-diffusing surface, the image pickup device is arranged such that a sensor surface of the image pickup device is positioned on an image plane of the imaging optical system, and when $N_p$ denotes a refractive index of the image side prism, $N_o$ denotes a refractive index of a medium outside the image side prism and $\alpha$ denotes an angle formed between the exit surface and the cut surface, the imaging optical system satisfies a condition:

$$\alpha > (\pi/2 + SIN^{-1}(N_o/N_p))/2 \qquad (2).$$

* * * * *